United States Patent [19]
Washo

[11] 4,347,265
[45] Aug. 31, 1982

[54] FORMATION OF AN ELECTROCHROMIC DISPLAY LAYER

[75] Inventor: Junichi Washo, Yamatokoriyama, Japan

[73] Assignee: Sharp Kabushiki Kaisha, Osaka, Japan

[21] Appl. No.: 120,987

[22] Filed: Feb. 13, 1980

[30] Foreign Application Priority Data

Feb. 16, 1979 [JP] Japan .................................. 54-17525

[51] Int. Cl.³ .............................................. G02F 1/17
[52] U.S. Cl. ...................................... 427/108; 29/570; 29/592 R; 252/408; 350/357; 427/110; 427/126.2; 427/126.3; 427/164; 427/165; 427/168; 427/169; 427/226; 427/227
[58] Field of Search ........................ 350/357; 252/408; 29/592 R, 570; 427/108, 226, 227, 110, 126.2, 164, 168, 165, 169, 126.3

[56] References Cited

U.S. PATENT DOCUMENTS 4,175,837 11/1979 Yamo et al. ......................... 350/357
4,233,339 11/1980 Leibowitz et al. .................. 350/357
4,266,335 5/1981 Matsumoto et al. ................. 350/357

FOREIGN PATENT DOCUMENTS 54-126557 10/1979 Japan .................................. 350/357
55-7778 1/1980 Japan .................................. 350/357
55-11208 1/1980 Japan .................................. 350/357
2028290 3/1980 United Kingdom ................ 350/357

Primary Examiner—Teddy S. Gron
Attorney, Agent, or Firm—Birch, Stewart, Kolasch & Birch

[57] ABSTRACT

An electrochromic display cell comprises two opposing glass substrates, transparent electrodes formed on the glass substrates, electrochromic layers formed on the transparent electrodes, and a liquid electrolyte disposed in the cell. The electrochromic layer is formed in the following manner. A metal compound such as tungsten chloride ($WCl_6$) is dissolved in an organic solvent such as an alcohol to obtain an organic solution including hydroxide ($W(OH)_6$). The organic solution is painted on the transparent electrode and, then calcined to obtain the electrochromic layer including tungsten oxide ($WO_3$).

10 Claims, 1 Drawing Figure

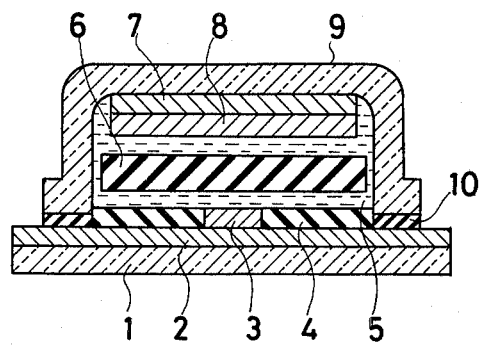

FORMATION OF AN ELECTROCHROMIC DISPLAY LAYER

BACKGROUND AND SUMMARY OF THE INVENTION

The present invention relates to an electrochromic display cell and, more particularly, to a method for making an electrochromic display layer in an electrochromic display cell.

Recently, an electrochromic display cell has been developed, which generally comprises two opposing electrochromic layers formed on electrodes, and a liquid electrolyte disposed therebetween. Tungsten oxide is most commonly used for the electrochromic layer, and its coloration/bleaching reaction is considered as follows: When the coloration current is applied to the electrochromic layer, the tungsten oxide ($WO_3$) layer changes to a tungsten bronze ($M_xWO_3$: where $x < 1$) due to the double injection of the electrons caused by the coloration current and metal positive ions (generally, alkali metals $M^+$) derived from the liquid electrolyte. This reaction creates lattice defects, and the tungsten $W(+5)$ changes to tungsten $W(+6)$ upon every removal of one $M^+$ from $MWO_3$ ($x=1$).

Accordingly, the coloration/bleaching operation is greatly influenced by the chemical structure of the electrochromic display layer ($WO_3$ layer). More specifically, the response speed of the coloration/bleaching operation, the coloration efficiency, the operation life period, the display quality, etc. are influenced by the method for making the electrochromic layer.

One conventional method for making the electrochromic layer employs the vacuum evaporation technique or the spattering technique to form the solid oxide film. This method requires a vacuum evaporation apparatus, and the control thereof is very complicated. The chemical structure of the electrochromic layer is influenced by the evaporation condition, for example, the evaporation rate, the pressure, and the substrate temperature. Therefore, this method is not suited for mass production.

Another conventional method for making the electrochromic layer is to paint a gel mixture of powder electrochromic material. This method is not practical since the layer formed through this method does not show a desirable transparency. Accordingly, an object of the present invention is to provide a novel method for making an electrochromic display layer.

Another object of the present invention is to provide an electrochromic display cell which ensures a stable operation.

Still another object of the present invention is to provide a method for making an electrochromic display layer suited for mass production.

Yet another object of the present invention is to provide an electrochromic display layer of stable construction and showing a high electrochromic efficiency.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electrochromic display layer is formed in the following manner. A metal compound, for example, tungsten chloride ($WCl_6$) is dissolved in an organic solvent such as methanol, iso-butanol or ethanol. The thus obtained organic solution is disposed on the electrode carried by the substrate through the use of, for example, a dipping method. Then, the organic solution layer is calcined to form the electrochromic layer having a stable construction.

BRIEF DESCRIPTION OF THE DRAWING

The present invention will be better understood from the detailed description given hereinbelow and the accompanying drawing which is given by way of illustration only, and thus is not limitative of the present invention and wherein:

The single FIGURE of the drawing is a sectional view of an embodiment of an electrochromic display cell of the present invention.

DESCRIPTION OF THE PREFERRED EMBODIMENTS

The electrochromic display cell of the present invention mainly comprises a front glass substrate 1, a transparent electrode layer 2, an electrochromic layer 3 functioning as the display electrode and electrically connected to the transparent electrode layer 2, an insulator layer 4 for protection purpose, a liquid electrolyte 5 disposed in the cell, a white plate 6 made of porous ceramics and functioning to provide a white display background, a conductive layer 7, another electrochromic layer 8 formed on the conductive layer 7 and functioning as a counter electrode, a rear glass substrate 9, and a seal member 10.

The transparent electrode layer 2 is formed on the front glass substrate 1, and the electrochromic layer 3 is formed thereon in a desired configuration. The insulator layer 4 is formed on the transparent electrode 2 at a position where the electrochromic layer 3 is not formed, thereby protecting the transparent electrode 2 from the liquid electrolyte 5. The electrochromic layers 3 and 8 are formed in the following manner. A metal compound is dissolved in an organic solvent to obtain an organic solution. The organic solution is painted on a substrate and then calcined to form a stable electrochromic layer.

[EXAMPLE I]

Tungsten chloride ($WCl_6$) is dissolved in alcohol, for example, methanol, iso-butanol, or ethanol to obtain hydroxide ($W(OH)_6$) or solution of a $WCl_6$. The thus obtained solution is painted onto the electrode carried by the substrate to form a painted layer. The thus formed painted layer is calcined to from an electrochromic layer of tungsten oxide. The painting operation can be achieved through the use of, for example, the dipping method, the conventional painting method, the spinner painting method or the printing method. The calcination temperature is preferably 200° C. through 500° C. The formation of the electrochromic layer is summaried as follows:

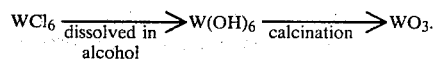

[EXAMPLE II]

Tungsten chloride (WCl$_6$) is mixed into acetic acid anhydride, for example, glacial acetic acid or carboxylic acid, and heated up to 150° C. to obtain acetic tungsten salt. The thus obtained acetic tungsten salt is decomposed in alcohol or organic solvent such as ester or aromatic compound to obtain the hydroxide. The thus obtained hydroxide is disposed on the electrode carried by the substrate, and then calcined at 200° C. through 500° C. to form the electrochromic layer of tungsten oxide. The tungsten compound is stably solved because the tungsten compound is heated up in the acetic acid anhydride. The formation of the electrochromic layer is summarized as follows:

$$WCl_6 + (CH_3CO)_2O \longrightarrow W(CH_3CO)_6$$

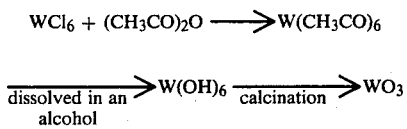

[EXAMPLE III]

Metallic ether W(OR)$_6$ (where R: isopropyl radical, n-butyl radical, etc.) is dissolved in an organic solvent, for example, xylene or toluene. The organic solution is disposed on the electrode formed on the substrate and, then, calcined at around 200° C. through 500° C.

In the above-mentioned example, it is preferable that the tungsten compound is mixed with a layer forming material and diluent. A preferred layer forming material is, for example, cellulose, starch or polyvinyl alcohol, and preferred diluent is, for example, methanol, ethanol, isopropanol, methyl acetate, acetone, xylene, toluene, etc. Preferred mixture composition of the tungsten compound, layer forming material and the diluent is as follows:

| tungsten compound: | 0.1 ~ 20% |
|---|---|
| layer forming material: | 1 ~ 5% |
| dilution: | 80 ~ 90% |

The mixture should be passed through a filter to remove the gel.

If a organic solution of a high viscosity is obtained, the electrochromic layer of a desired, configuration can be directly formed through the use of a printing method.

Molybdenum can be employed instead of the tungsten compound.

Since every step is conducted within the atmosphere, the present method is very suited for mass production. Moreover, the electrochromic layer formed through the present method shows a fine structure as compared with the electrochromic layer formed through the conventional evaporation method. It is apparent that a finer layer can be formed by controlling the filtration accuracy of the organic solution. A electrochromic layer tightly fixed to the electrode can be formed by controlling the fineness of the layer and the calcination temperature. Moreover, the present method is very effective to form the electrochromic layer on an uneven surface.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process of making an electrochromic layer comprising the steps of:
   providing a metallic compound selected from one member of the group consisting of chlorides and ethers of tungsten and molybdenum;
   dissolving said metallic chloride in an organic alcohol solvent therefor or said metallic ether in an aromic hydrocarbon solvent therefor so as to produce an organic solution;
   applying said organic solution to the surface of a substrate; and
   calcining said resulting coated substrate at a temperature of from 200° to 500° C. to produce said electrochromic layer.

2. The process of claim 1, wherein said metallic compound comprises tungsten chloride and said organic solvent comprises an alcohol for said tungsten chloride.

3. The process of claim 1, wherein said metallic compound comprises a tungsten ether and said organic solvent comprises an aromatic hydrocarbon therefor.

4. The process of claim 1, wherein said metallic material is a tungsten compound having included therewith a layer-forming material.

5. The process of claim 4, wherein said layer-forming material is selected from at least one member of the group consisting of cellulose, starch and polyvinyl alcohol.

6. A process of making an electrochromic layer comprising the steps of:
   preparing a tungsten chloride solution in an acetic acid anhydride solvent;
   heating said solution to a temperature of about 150° C. to obtain an acetic tungsten salt;
   dissolving said tungsten salt in an alcohol solvent therefor so as to produce tungsten hydroxide;
   applying said tungsten hydroxide solution to a substrate; and
   calcining said coated substrate at a temperature of from 200° to 500° C. to form said electrochromic layer comprising tungsten oxide.

7. The process of claim 6, wherein a layer-forming material is mixed with said tungsten chloride and acetic acid anhydride.

8. The process of claim 7, wherein said layer-forming material is selected from at least one member of the group consisting of cellulose, starch and polyvinyl alcohol.

9. A process of preparing an electrochromic display cell which comprises:
   providing a transparent substrate having formed thereon a transparent electrode; and
   forming an electrochromic layer on the surface of said transparent electrode according to the process steps of claim 1.

10. A process of forming an electrochromic display cell which comprises:
    providing a transparent substrate having formed on the surface thereof a transparent electrode; and
    forming an electrochromic layer selectively on the surface of said transparent electrode according to the process of claim 6 to produce said electrochromic display cell.

* * * * *